UNITED STATES PATENT OFFICE.

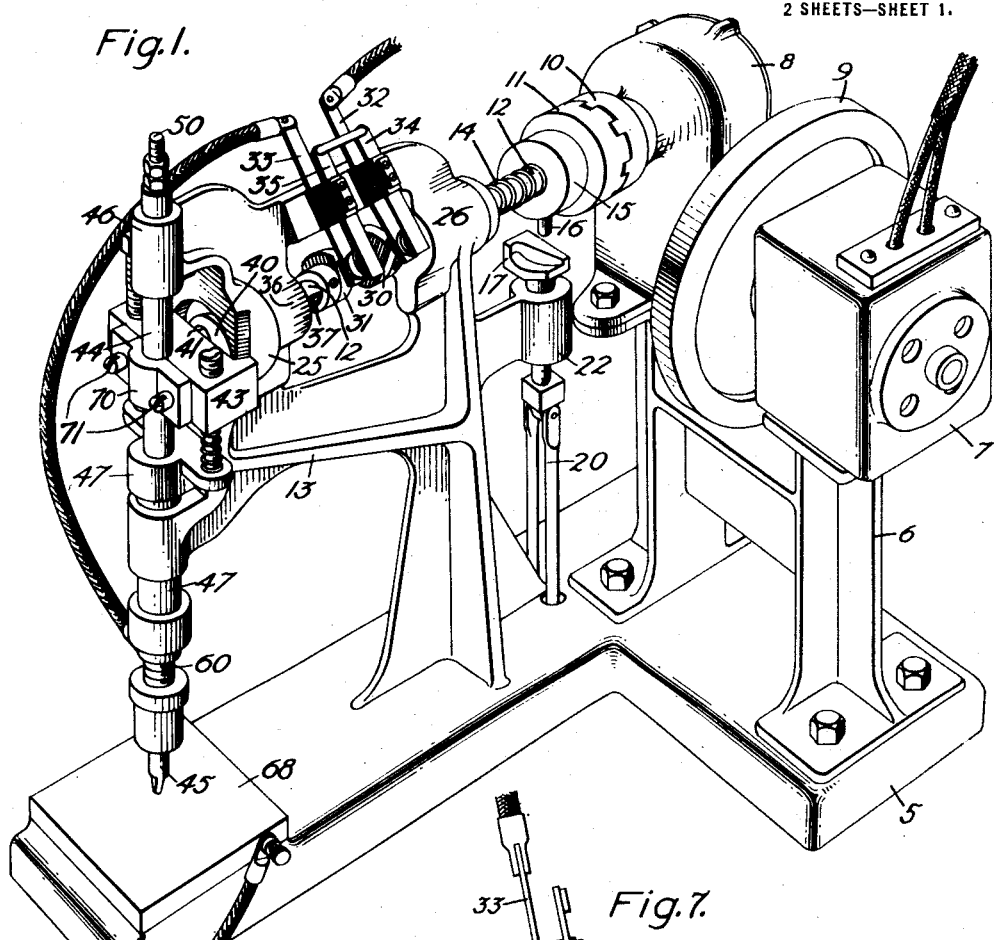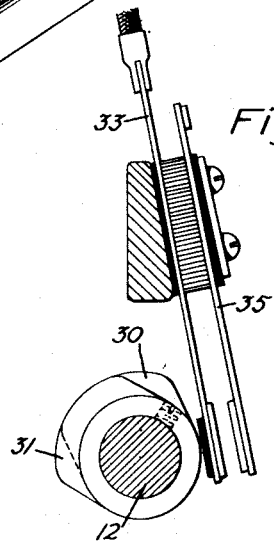

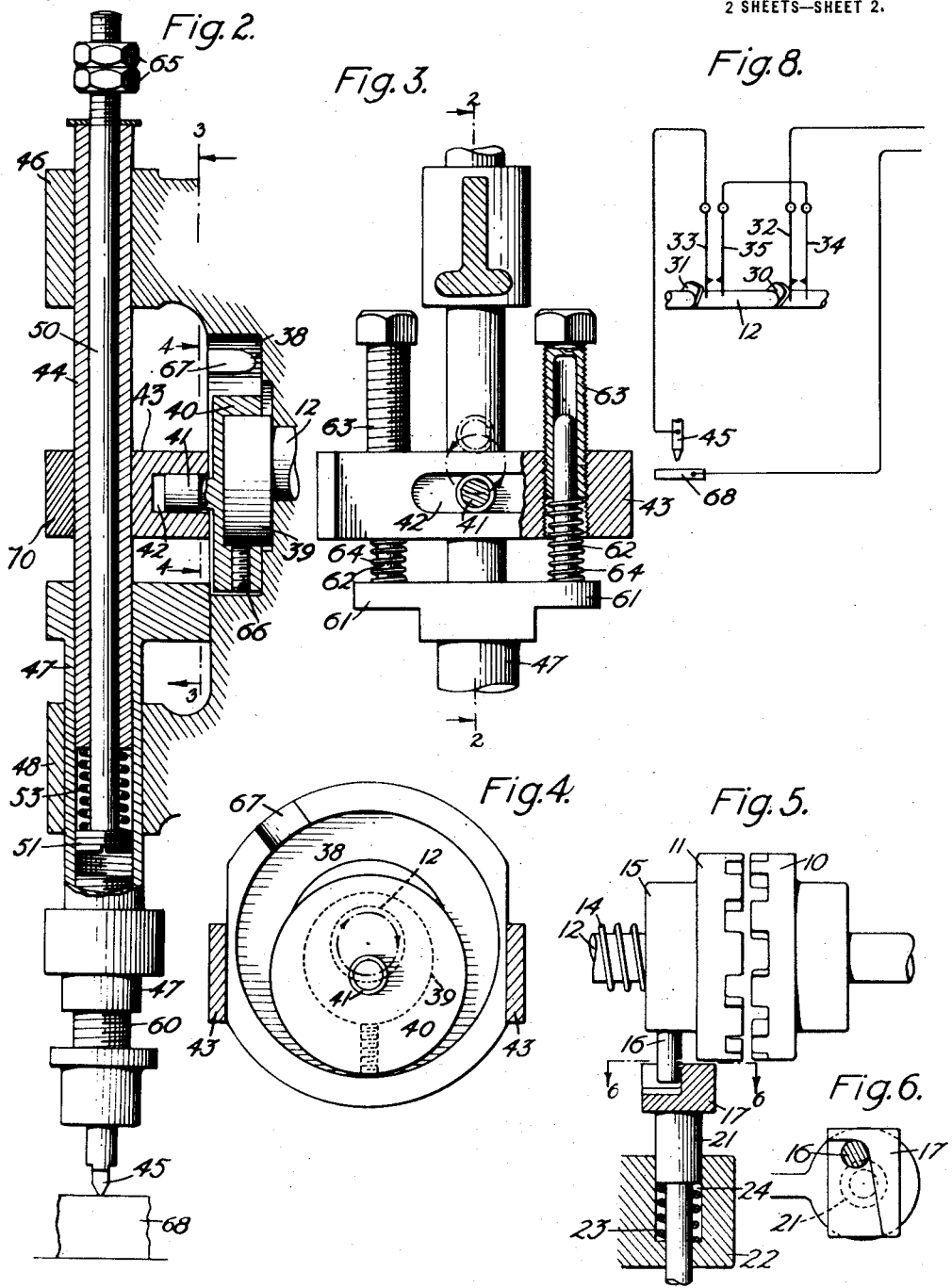

WILLIAM FERRIS HENDRY, OF OSSINING, NEW YORK, ASSIGNOR TO WESTERN ELECTRIC COMPANY, INCORPORATED, OF NEW YORK, N. Y., A CORPORATION OF NEW YORK.

WELDING-MACHINE.

1,360,948.  Specification of Letters Patent.  Patented Nov. 30, 1920.

Application filed March 22, 1920. Serial No. 367,582.

*To all whom it may concern:*

Be it known that I, WILLIAM FERRIS HENDRY, a citizen of the United States, residing at Ossining, in the county of Westchester, State of New York, have invented certain new and useful Improvements in Welding-Machines, of which the following is a full, clear, concise, and exact description.

This invention relates to electric resistance welding machines, and more particularly to a power driven welding machine of this type.

The object of this invention is to produce a power driven resistance welding machine capable of being so adjusted as to meet the requirements of any particular welding job within certain limits as to size of work handled and which when so adjusted will continually turn out a good product without the exercise of any particular skill on the part of the operator.

In the general construction and combination of the various parts entering into the machine of this invention provision is made for the following features of operation; a light pressure will be produced between the surfaces to be welded, which pressure will be sufficient to follow up as the metal is softened due to the temperature rising to a welding temperature; a sudden increase in pressure at just the right instant when the welding heat has been obtained to force the two pieces intimately together; an application of current at the beginning of the first light pressure and the cutting off of this current at about the time of the increased pressure and then a gradual relaxation of the pressure upon the parts to be welded sufficient to hold them in position while they are cooling but not sufficient to distort the metal of the weld.

As another feature of this invention, means are provided for varying the length of the stroke of the movable electrode whereby it may be readily adapted to operate upon structures of different thicknesses.

Other features of the invention relate to certain details of construction and combination of parts as will hereinafter more fully appear.

In the drawings illustrating this invention, Figure 1 is a perspective view of a welding machine embodying the features of this invention; Fig. 2 is a longitudinal sectional view taken upon line 2—2 of Fig. 3; Fig. 3 is a sectional view taken upon line 3—3 of Fig. 2; Fig. 4 is a cross-sectional view taken upon line 4—4 of Fig. 2; Fig. 5 is an enlarged detail view with parts in section of the clutch and trip mechanism used in this machine; Fig. 6 is a cross-sectional view taken upon line 6—6 of Fig. 5; Fig. 7 is an enlarged detail view of contact making mechanism used in this invention, and Fig. 8 is a schematic circuit including the contact mechanism.

As shown in the drawing, 5 designates an L-shaped supporting base upon one end of which is mounted a supporting bracket 6 carrying a motor 7 connected by a suitable shaft (not shown) with a gear train (not shown) inclosed in a gear box 8. Mounted upon the shaft connecting the motor with the gear train is a fly wheel 9. Driven by the gear train in the box 8 is a clutch member 10 adapted to engage a clutch member 11 mounted upon a shaft 12 supported in a bracket member 13 carried by the base plate 5. The clutch member 11 is slidable upon the shaft 12 and is adapted to be moved into engagement with the clutch member 10 by means of a spring 14 surrounding the shaft 12 and having one end in engagement with the bracket member 13 and the other in engagement with a collar 15 on the clutch member 11. Secured to the collar member 15 is a pin 16 adapted to coöperate with a cam tripping member 17 operated through the agency of a foot pedal (not shown) to which it is connected by rods 20.

As more clearly shown in Fig. 5, the cam member 17 is carried upon a plunger 21 adapted to slide in a support 22 carried by the bracket member 13. A spring 23 surrounding a reduced portion of the spindle 21 and located in a recess 24 in the supporting member 22 serves to move the cam member 17 into engagement with the pin 16 to disengage the clutch members and normally hold the clutch member 11 out of engagement with clutch member 10. When this cam member is operated by the foot treadle it is disengaged from the pin 16, thereby permitting the clutch member 11 to be moved by the action of the spring 14 into engagement with the clutch member 10.

The shaft 12 is rotatably supported in suitable bearings 25 and 26 formed upon the bracket member 13. Mounted between the ends of the shaft 12 are a pair of adjustable spring actuating cams 30 and 31 which coöperate with and move contact members 32 and 33 into engagement with contact members 34 and 35 to thereby complete a circuit to the welding electrodes. The contacts are in series and must both be closed in order to complete a circuit to the electrodes, and the period of this closure may be determined by proper adjustment of the cams 30 and 31 upon the shaft 12.

Each of the cams 30 and 31 are fastened to the shaft 12 by suitable means such as set screws. In order to accurately dispose the one angularly with respect to the other, it will be noted that a scale having graduations 36 in terms of degrees is provided on the face of the bracket 25 and that the shaft 12 carries a pointer 37 which, with the shaft 12, is adapted to travel with its edge adjacent the scale. One cam, say 30, is fixed on the shaft 12 with the other cam not fixed but lined up with it and the position of the pointer 25 is noted, after which the shaft 12 is moved in the desired direction until the pointer has passed over the desired number of degrees in the scale. The cam 31 which has been held stationary during the movement of shaft 12 is then fixed in this second position on the shaft 12 which is therefore the required angular distance from the first cam.

Upon the inner end of the shaft 12 and in a recessed portion 38 of the bracket member 13 is an eccentric head 39 upon which is adjustably mounted an eccentric cam disk 40 carrying a projecting pin 41. This pin 41 is adapted to engage in a slot 42 of a cross head 43 which is rigidly and adjustably secured by means of a clamping plate 70 and set screws 71—71 to a reciprocating sleeve 44 through the indirect agency of which a movable electrode 45 is reciprocated. At its upper end the sleeve 44 slides in a projecting supporting member 46 carried by the bracket member 13, and at its lower end it is adapted to slide in a second sleeve 47 which in turn is slidable in a bracket member 48 secured to the frame member 13. Slidably mounted within the sleeve 44 is a rod 50 the lower end of which is provided with a screw threaded head 51 adapted to engage internal screw threads in the sleeve 47. Located below the lower end of the sleeve 44 and the upper face of the head 51 and surrounding the rod 50 is a spring 53, which is a short stiff one, through the agency of which the last part of the reciprocal movement of the sleeve 44 is transmitted to the rod 50 and thereby through the sleeve 47 to give a hammer blow to the work at the right instant. The electrode 45 is carried by a screw threaded supporting member 60 which is secured in the lower end of the sleeve 47.

A right-angled extension 61 upon the sleeve 47 carries a pair of upwardly projecting pins 62—62 which extend upwardly into hollow screw-threaded studs 63—63 supported in screw-threaded openings in the cross head 43. Surrounding each of these projecting pins is a spring 64 the lower end of which bears against the extended portion 61 of the sleeve 47, the upper end being in engagement with the lower end of the screw-threaded stud 63. The springs 64, 64 are comparatively light pressure springs and it is through them that the preliminary pressure is transmitted to the electrodes to furnish the initial pressure.

On the upper end of the rod 50 are adjustable locking nuts 65—65 by means of which the length of the stroke of the movable electrode 45 may be adjusted.

The cam disk 40 is adjustably secured to the eccentric head 39 through the agency of a set screw 66 which is accessible for adjustment through an opening 67 in the bracket member 13. By adjusting the cam disk 40 circumferentially of the cross head 39 the amount of vertical movement of the projecting pin 41 and consequently of the cross head 43 may be varied within certain limits.

In any particular class of work to be welded upon the machine of this invention the length of stroke will first be determined and the shifting eccentric 40 adjusted for the length of stroke. By suitable adjustment of the sleeve 44 with respect to the cross head 43 the parts may be positioned for different thicknesses of work. By adjusting the tension of springs 62, 62 and the position of the contact closing cams 30 and 31 the preliminary pressure upon the work with respect to the application of the welding current may be determined. This adjustment of springs 64, 64 and sleeve 44 with respect to the cross head 43 will be such that the application of the light pressure to the work through the springs will be coincident with the flow of electric current through the pieces controlled by the adjustable contacts. The adjustment of sleeve 44 and cross head 43 is also such that sleeve 44 will not come into contact with the short stiff spring 53 until near the end of the downward stroke of the sleeve 44 to give the hammer blow necessary to mash the plastic metals into intimate contact. This action occurs usually not sooner than 150 degrees from the top center. At or near this point the cams 30 and 31 are set to break the contact of the welding circuit and the cross head 43 starts on the return movement of its stroke thereby causing the sleeve 44 to leave spring 53, and the two parts which have been welded are held in contact during the upward movement of the cross head 43 by the light springs 64, 64, the pressure of these springs being relieved at the end of the upward movement of the cross head 43.

It will be seen that the machine of this invention combines in a convenient and simple structure the elements by means of which the features for producing a satisfactory weld may be readily obtained over a wide range of conditions and without the exercise of any particular skill on the part of the operator.

What is claimed is:

1. In a power operated resistance welding machine, a stationary electrode, a movable electrode, means for reciprocating the movable electrode, means for causing the electrodes to engage the work with an initial light pressure in the movement toward each other of the electrodes and in the return movement of the movable electrode, means for causing a sudden increased pressure between the electrodes near the forward part of the stroke of the movable electrode, and means for controlling the application of welding current during the forward movement of the movable electrode.

2. In a power operated resistance welding machine, a stationary electrode, a movable electrode, a cross head for operating the movable electrode, resilient means interposed between the cross head and the movable electrode for causing the electrodes to engage the work with an initial light pressure in the preliminary forward movement of the movable electrode and in the return movement thereof, means rendered effective near the end of the forward movement of the movable electrode to cause a sudden momentary increase of pressure between the electrodes and the work, and means for automatically controlling the flow of current through the electrodes.

3. In a power operated resistance welding machine, a stationary electrode, a movable electrode, a reciprocating sleeve upon which the movable electrode is carried, a power driven cross head for operating said sleeve, resilient means interposed between said cross head and said sleeve for causing the electrodes to exert a light pressure upon the work during the preliminary forward movement of the movable electrode and the return movement of said electrode, means controlled by the cross head for causing a sudden increase of pressure between the electrodes at or near the limit of the forward movement of the movable electrode, and means for controlling the flow of current through the electrodes.

4. In a power operated resistance welding machine, a movable electrode, a stationary electrode, a reciprocating sleeve upon which the movable electrode is carried, a power driven cross head, resilient means interposed between the cross head and reciprocating sleeve to cause the electrodes to exert a light pressure upon the work during the preliminary forward movement and the return movement of the movable electrode, a second sleeve connected directly with the cross head, means acted upon by said second sleeve near the end of the forward stroke of the movable electrode for causing a sudden increased pressure between the electrodes, and means for controlling the flow of current through the electrodes.

5. In a power driven resistance welding machine, a movable electrode, a stationary electrode, a reciprocating sleeve upon which the movable electrode is carried, a power driven cross head, resilient means through which said cross head is caused to act upon said sleeve to cause the electrodes to exert a light pressure upon the work during the preliminary forward movement and the return movement of the movable electrode, a second resilient means operated near the limit of the forward stroke of the movable electrode to cause a sudden increase of pressure between the electrodes, and means for controlling the flow of current through the electrodes.

6. In a power operated resistance welding machine, a stationary electrode, a movable electrode, means for adjusting the length of stroke of the movable electrode, resilient means actuated in the movement of the movable electrode for causing the electrodes to engage the work with a light pressure during the initial forward movement and the return movement of the movable electrode and with a sudden increase in pressure near the forward limit of movement of the movable electrode, means for adjusting said movable electrode and resilient means for different thicknesses of work, and means for adjusting the time and duration of the application of welding current.

7. In an electric welding apparatus, a reciprocating electrode carrier, a power driven shaft, a driving connection between the power driven shaft and the electrode carrier, and means for adjusting said connection for controlling the length of the stroke of the electrode carrier.

8. In an electric welding apparatus, a reciprocating electrode carrier, a power driven shaft, an eccentric connection between the power driven shaft and the electrode carrier, and means for adjusting said eccentric connection for varying the length of stroke of the electrode carrier.

9. In an electric welding apparatus, a reciprocating electrode carrier, a power driven shaft, a cam surface upon one end of said shaft, a cam ring adjustably mounted upon said cam surface, a pin projecting from the cam ring, and a cross head secured to the electrode carrier with which said pin engages.

In witness whereof I hereunto subscribe my name this 19th day of March, A. D. 1920.

WILLIAM FERRIS HENDRY.